US007574655B2

(12) United States Patent
Manders et al.

(10) Patent No.: US 7,574,655 B2
(45) Date of Patent: Aug. 11, 2009

(54) SYSTEM AND METHOD FOR ENCAPSULATION OF REPRESENTATIVE SAMPLE OF MEDIA OBJECT

(75) Inventors: Blake D. Manders, Kirkland, WA (US); Oren Rosenbloom, Redmond, WA (US); Vladimir Sadovsky, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 487 days.

(21) Appl. No.: 10/836,261

(22) Filed: May 3, 2004

(65) Prior Publication Data

US 2005/0246375 A1 Nov. 3, 2005

(51) Int. Cl.
*G06F 3/00* (2006.01)
*G06F 7/00* (2006.01)
*G06F 12/00* (2006.01)

(52) U.S. Cl. .............................. 715/716; 707/1; 707/200

(58) Field of Classification Search ................. 715/716; 707/200

See application file for complete search history.

(56) References Cited

U.S. PATENT DOCUMENTS

| 5,887,193 | A | 3/1999 | Takahashi et al. |
|---|---|---|---|
| 6,133,908 | A | 10/2000 | Scibora et al. |
| 6,181,342 | B1 * | 1/2001 | Niblack ...................... 345/635 |

(Continued)

FOREIGN PATENT DOCUMENTS

EP 0637157 A2 2/1995

(Continued)

OTHER PUBLICATIONS

Satran K. Meth, "Internet Small Computer Systems Interface", Apr. 2004, p. 183-p. 205, European Patent Office.

(Continued)

*Primary Examiner*—Tadesse Hailu
*Assistant Examiner*—Nicholas S Ulrich
(74) *Attorney, Agent, or Firm*—Shook, Hardy & Bacon LLP (57) ABSTRACT

A system and related techniques relate to the retrieval of a media object list with associated properties from a media device such as a digital video camcorder, audio player or other source or device. According to embodiments the retrieved list or set of media objects and their attributes or properties, for example a song list along with song length, codec, artist and other information may be retrieved from the source device, along with a representative sample of the media or content of each object. So the title which identifies a song may be accompanied by a short sound clip of a representative sample of that song, or a title identifying a digital video movie may be accompanied by a short video clip of an introductory portion of that movie. According to the invention in one regard, that representative sample may be generated in the source device and encapsulated into the set of properties which are passed with the object identifier to an initiator device, such as a user's computer accessing a video camera for downloading. A media object which is stored in monolithic binary format with no predetermined internal samples may nevertheless be accessed and sampled to allow a user to view or listen to representative content, through encapsulation of a sample in the properties passed via an underlying media transport protocol.

30 Claims, 5 Drawing Sheets

U.S. PATENT DOCUMENTS

| | | | |
|---|---|---|---|
| 6,370,543 | B2 | 4/2002 | Hoffert et al. |
| 6,922,813 | B1 | 7/2005 | Korenshtein |
| 7,194,701 | B2 * | 3/2007 | Stavely et al. ............... 715/838 |
| 7,206,853 | B2 | 4/2007 | Eytchison et al. |
| 7,376,333 | B2 | 5/2008 | Chung et al. |
| 2001/0014891 | A1 | 8/2001 | Hoffert et al. |
| 2001/0042107 | A1 | 11/2001 | Palm |
| 2002/0112226 | A1 | 8/2002 | Brodersen et al. |
| 2003/0014415 | A1 * | 1/2003 | Weiss et al. ................... 707/10 |
| 2003/0046437 | A1 | 3/2003 | Eytchison et al. |
| 2003/0110514 | A1 | 6/2003 | West et al. |
| 2003/0135661 | A1 | 7/2003 | Barker et al. |
| 2004/0125756 | A1 | 7/2004 | Lepore et al. |
| 2004/0205286 | A1 | 10/2004 | Bryant et al. |
| 2005/0278442 | A1 | 12/2005 | Motoyama et al. |
| 2006/0129938 | A1 | 6/2006 | Humpleman et al. |

FOREIGN PATENT DOCUMENTS

| | | |
|---|---|---|
| EP | 1081897 A1 | 3/2001 |
| EP | 1199874 | 4/2002 |
| EP | 1429532 | 6/2004 |
| WO | 9859282 | 12/1998 |
| WO | 9907111 | 2/1999 |
| WO | 2005111869 A3 | 11/2005 |

OTHER PUBLICATIONS

Erik Guttman, "Vendor Extensions ofr Service Location Protocol, Version 2", Oct. 6, 2001, p. 1-p. 7, European Patent Office.

Simpson, "PPP Vendor Extensions", May 1997, pp. 1-p. 5, European Patent Office.

Scott O. Bradner, "Considerations on the Extensibility of IETF Protocols" Jun. 4, 2004, p. 1-p. 10, European Patent Office.

Microsoft Corporation, Apr. 24, 2002, Paragraph 0025- Paragraph 0065, European Patent Office.

Blacke Manders; Oren Rosebloom, "Media Transfer Protocol" May 17, 2004, pp. 1-36, URL:http://www.microsoft.com.

Int'l Search Report dated Mar. 15, 2006, for corresponding PCT Appl. No. PCT/US04/24962.

First Office Action, Mailed Jan. 11, 2008, in U.S. Appl. No. 10/836,260, filed May 3, 2004.

Final Office Action, Mailed Jul. 23, 2008, in U.S. Appl. No. 10/836,260, filed May 3, 2004.

Notice of Allowance and Fee(s) Due, Mailed Oct. 20, 2008, in U.S. Appl. No. 10/836,260, filed May 3, 2004.

Corcoran, P.M., "Mapping Home-Network Appliances to TCP/IP Sockets Using a Three Tiered Home Gateway Architecture", Aug. 1998, IEEE Transactions.

EPC Search Report, EPO 0 40 10221, Jul. 15, 2005, Microsoft Corporation.

EPC Search Report, EPO 0 50 14693, Nov. 24, 2005, Microsoft Corporation.

Final Rejection in U.S. Appl. No. 10/429,116, dated Dec. 8, 2008.

Second Notice of Allowance and Fee(s) Due, mailed Dec. 16, 2008, in U.S. Appl. No. 10/836,260, filed may 3, 2004.

U.S. Patent and Trademark Office, U.S. Appl. No. 10/429,116, Filed: May 2, 2003; Non-Final Rejection, Jan. 16, 2007.

U.S. Patent and Trademark Office, U.S. Appl. No. 10/429,116, Filed: may 2, 2003; Amendment After Reconsideration, Apr. 16, 2007.

U.S. Patent and Trademark Office, U.S. Appl. No. 10/429,116, Filed: May 2, 2003; Non-Final Rejection, Jun. 27, 2007.

U.S. Patent and Trademark Office, U.S. Appl. No. 10/429,116, Filed: May 2, 2003; Amendment Req. After Non-Final, Sep. 11, 2007.

U.S. Patent and Trademark Office, U.S. Appl. No. 10/429,116, Filed: May 2, 2003; Final Rejection, Nov. 28, 2007.

U.S. Patent and Trademark Office, U.S. Appl. No. 10/429,116, Filed: May 2, 2003; Amendment after Final, Jan. 28, 2008.

U.S. Patent and Trademark Office, U.S. Appl. No. 10/429,116, Filed: May2, 2003; Advisory Action, Feb. 21, 2008.

U.S. Patent and Trademark Office, U.S. Appl. No. 10/429,116, Filed: May 2, 2003; Amendment submitted with RCE, Mar. 28, 2008.

U.S. Patent and Trademark Office, U.S. Appl. No. 10/429,116, Filed: May 2, 2003; Non-Final Rejection, Jun. 24, 2008.

U.S. Patent and Trademark Office, U.S. Appl. No. 10/429,116, Filed: May 2, 2003; Amendment/Req. Reconsideration-After Non-Final Reject, Sep. 24, 2008.

U.S. Patent and Trademark Office, U.S. Appl. No. 10/836,260, Filed: May 3, 2004; Response to First Office Action filed Apr. 11, 2008.

U.S. Patent and Trademark Office, U.S. Appl. No. 10/836,260, Filed: May 3, 2004; RCE and Amendment filed Sep. 23, 2008.

U.S. Patent and Trademark Office, U.S. Appl. No. 10/836,260, Filed: May 3, 2004; RCE and IDS filed Nov. 14, 2008.

* cited by examiner

SYSTEM AND METHOD FOR ENCAPSULATION OF REPRESENTATIVE SAMPLE OF MEDIA OBJECT

CROSS-REFERENCE TO RELATED APPLICATION

The subject matter of this application is related to the subject matter of co-pending U.S. patent application Ser. No. 10/429,116 filed May 2, 2003 entitled "System and Method for Facilitating Communication Between a Computing Device and Multiple Categories of Media Devices", assigned or under obligation of assignment to the same entity as this application, and which application is incorporated by reference herein.

STATEMENT REGARDING FEDERALLY SPONSORED RESEARCH OR DEVELOPMENT

Not applicable.

FIELD OF THE INVENTION

The invention relates to the field of computing, and more particularly to a platform which retrieves a list of media objects from a source device, such as an audio player or digital camcorder, along with a representative sample of the content of the media object to allow the user to view or access that song, video or other sample, even when the original content contains no predefined internal sample.

BACKGROUND OF THE INVENTION

The steady increase in capacity and types of digital media devices has driven a need for more sophisticated and flexible digital media interchange protocols and services. Users for instance often wish to share or exchange digital content such as digital photographs, digital videos and other media or content, as well as manipulate and manage the content which they possess. In a typical scenario a user may wish to view the set of videos, photographs, songs or other media on their portable media or other device.

Figure 1:
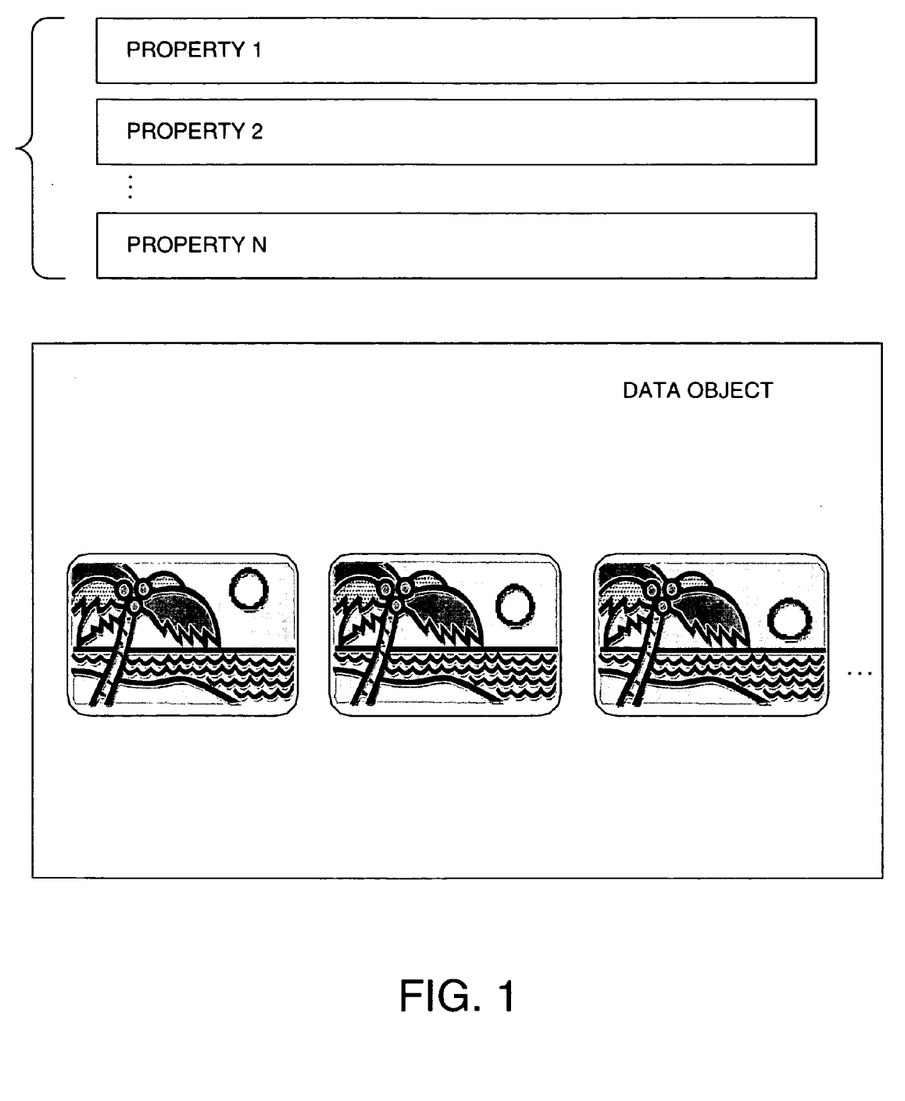
FIG. 1 illustrates a diagram of content a media object, according to known technologies.

As illustrated in FIG. 1, when a user for example wishes to retrieve or upload a set of digital videos stored on their digital camcorder, they may access a directory on that device to identify the videos which are stored and can be accessed. The digital video content is generally stored in an object-based format, in which each complete video shoot is contained in a media object which has a set of associated attributes or properties, such as length of video, the codec used in that video, date and time information, author or owner information, or other data or properties. The video frames themselves may be stored in a binary format encoding pixel values and other information. In general the binary media object is stored as a single, monolithic data structure with no constituent parts. Rather, the object's properties may identify the frame length, frame size, color depth and other properties needed to read or consume that content. In general object-based storage may make retrieval of media objects, or data synchronization between two or more media devices, more efficient.

When a user wishes to view a list of the media objects stored on their digital camcorder, camera or other device, for example on a connected personal computer or other client, they may be presented with a list of the video objects, along with date and other properties. However, a table or listing of the content by name or other field may not prompt the user with an idea of the content which each video or other object may contain. Identifying content may become even more difficult when for example when the digital device contains a large quantity of media objects. The user however would often like to be given an indication of the content of a given object, for example before printing, storing or otherwise manipulating that content. With some of that objective in mind, some file or media formats permit for example the generation of a thumbnail representation of a digital photograph.

However, audio, video or other media content can often not be readily represented in sample form, and that content is typically not structured for purposes of sample selection. One issue is that a representative sample must be identified by type before it is accessed. The sample must be given a media type to permit an appropriate decoder to be applied, for instance, before showing or playing that sample object to the user via a user interface. Without an indication of a type for the binary sample, deciphering that content for sample purposes is not possible.

Moreover, even with an identified type, for instance indicating a video sample, the permitted ranges of properties for that sample must likewise be defined to permit playback. For example, the pixel size of a video frame or the frame playback rate may need to be constrained within the playback capabilities of a portable device or other playback machine. Even if for example the first five seconds of the content were for instance selected as a default sample, the format, size or other properties of that sample might not be compatible with the portable device or other playback client, so that reliable playback might not be ensured or possible.

The first few frames of a video clip or first few seconds of digital audio may also in many cases not be very representative of the media content as a whole, since video and audio media may vary substantially over the length of the content. Other problems in digital media storage and management exist.

SUMMARY OF THE INVENTION

The invention overcoming these and other problems in the art relates in one regard to a system and method for the encapsulation of a representative sample of a media object, in which source video, audio, image or other content may be accessed to generate a set of properties describing that object. In embodiments, the set of metadata making up that collection of properties may be extended to include a representative sample of the media object, which representative object may be stored within the set of properties for that media object, but also having a further set of properties of its own. The representative sample properties may for example define a type for the sample object along with properties such as frame width, frame length, song sample point or other parameters which permit the generation of a sample representation which may be flexibly identified for each media object. The sample may then for example be transmitted ahead of that object to view the content in a media list or other view. Because the representative sample may be extracted from the underlying object and integrated into that object's set of properties, any media object can have an associated sample generated for it, even when the binary content of the object does not contain or can not store such a representation. In embodiments, algorithms may be used to determine a suitable sample selection.

DETAILED DESCRIPTION OF EMBODIMENTS

Figure 2:
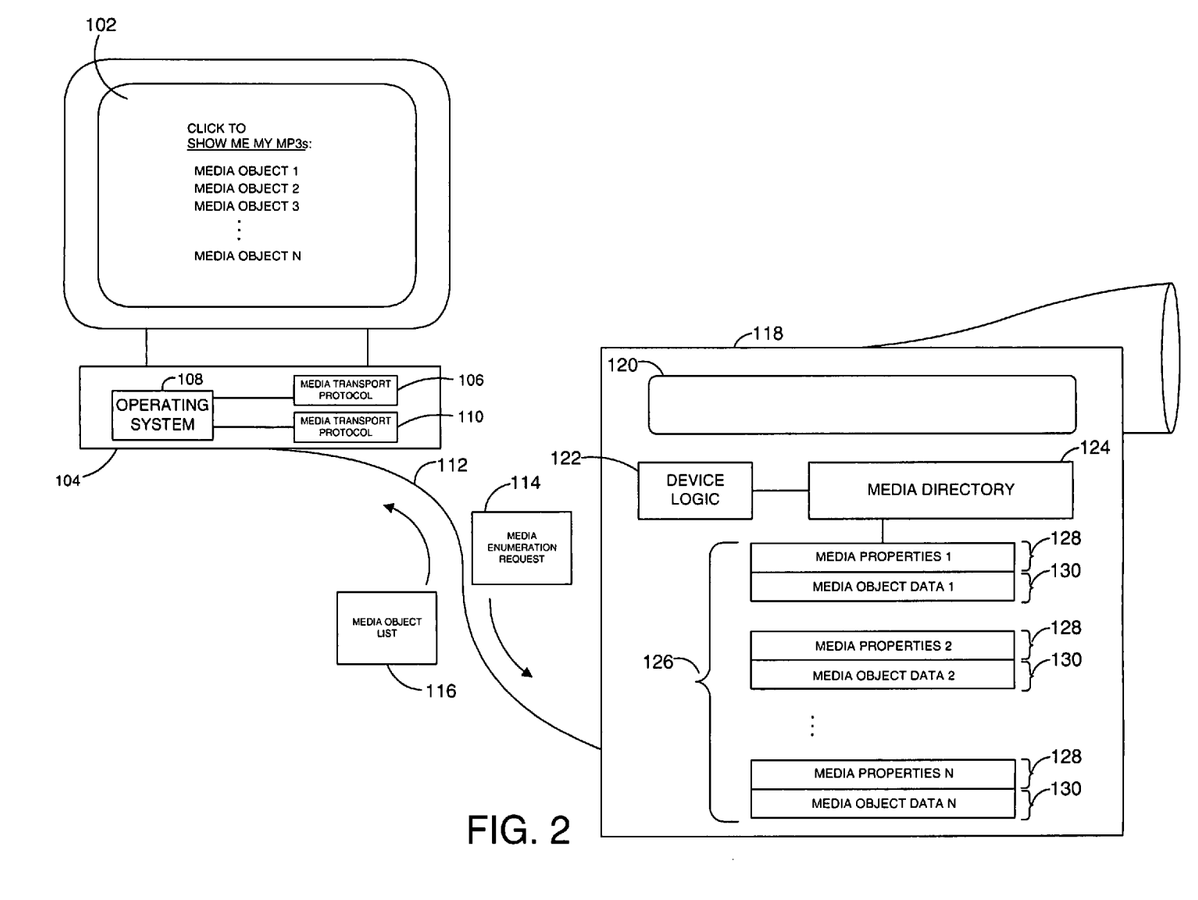
FIG. 2 illustrates an environment in which a system for encapsulation of a representative sample of a media object may operate, according to embodiments of the invention.

FIG. 2 illustrates an architecture in which a system and method for optimized retrieval of object properties may operate, according to an embodiment of the invention. As illustrated in that figure a user may operate a client computer or other initiator 104, for example via a user interface 102 to initiate media object retrieval activities, including streamed or aggregate retrieval of media object properties. According to the invention in one regard, the retrieval operations may be performed on media objects and associated data stored on a media player or other responder 118.

The responder 118 may be or include, for example, a portable audio player or playback device such as an MP3 (MPEG-1, Audio Layer 3), Windows™ Media Audio player, Advanced Audio Coding (AAC) or other portable or desktop audio device, a digital camera such as a digital camera storing JPG (Join Photographic Experts Group) or other files or objects, a digital camcorder such as a digital video (DV), miniDV, digital versatile disk (DVD) or other video capture or playback device, a media-enabled cellular telephone such as a digital camera-equipped cellular device, a personal digital assistant or other platforms, hardware or devices.

The responder 118 may host or contain a set of media objects 126 encoding the audio, video, image or other media or content stored thereon. The set of media objects 126 may include, for example, a set of audio objects, such as music, voice recordings or other audio content, digital photographs such as those downloaded from a digital camera, from a photo sharing or other Internet site, or other source, a set of video objects such as DV-compatible video clips, or other objects, media or content. The responder 118 may store the set of media objects 126 in or organized by a media directory 124, which may be or include a file hierarchy or indexing format for storing or accessing the set of media objects 126 to or from a hard drive, flash memory, optical drives such as CR-ROM or CD-ROM R/W, DVD or other magnetic, optical, electronic or other media stores. The responder 118 may communicate with the initiator via a connector 112 such as a universal serial bus (USB) 2.0 connection, FireWire™ connection or other wired or wireless port, interface or connection. The responder 118 may operate under control of embedded device logic 122, which may be, include or interface to a microprocessor, microcontroller, digital signal processor or other control circuitry, along with for instance firmware or other programming. Responder may include an interface 120 such as an LCD (liquid crystal display) screen to display media object data and other information, such as song lists, photograph slideshows or other data or displays.

In operation of the invention according to embodiments as shown, the user may for instance manipulate the user interface 102 to choose a media object retrieval function, for instance via a media engine 106 which may be in communication with or integrated in an operating system 108, such as the Windows™ family of operating systems or others. When object enumeration is desired, the media engine 106 may generate a media enumeration request 114 passed through operating system 108 and communicated to the responder 118, for example, via a media transport protocol 110. The media transport protocol 110 may in embodiments be or include, for example, the protocol described in the aforementioned U.S. patent application Ser. No. 10/429,116 or other protocols or standards.

The media enumeration request 114 so generated may in one regard not be limited to a retrieval mechanism whereby only a list of media object identifiers may be globally retrieved, necessitating further requests and overhead to view the properties or attributes coupled to those objects. Rather, according to embodiments of the invention, the media enumeration request 114 may be configured and enabled to request object properties for some or the entire collection of objects in responder 118, in one command structure.

Figure 3:
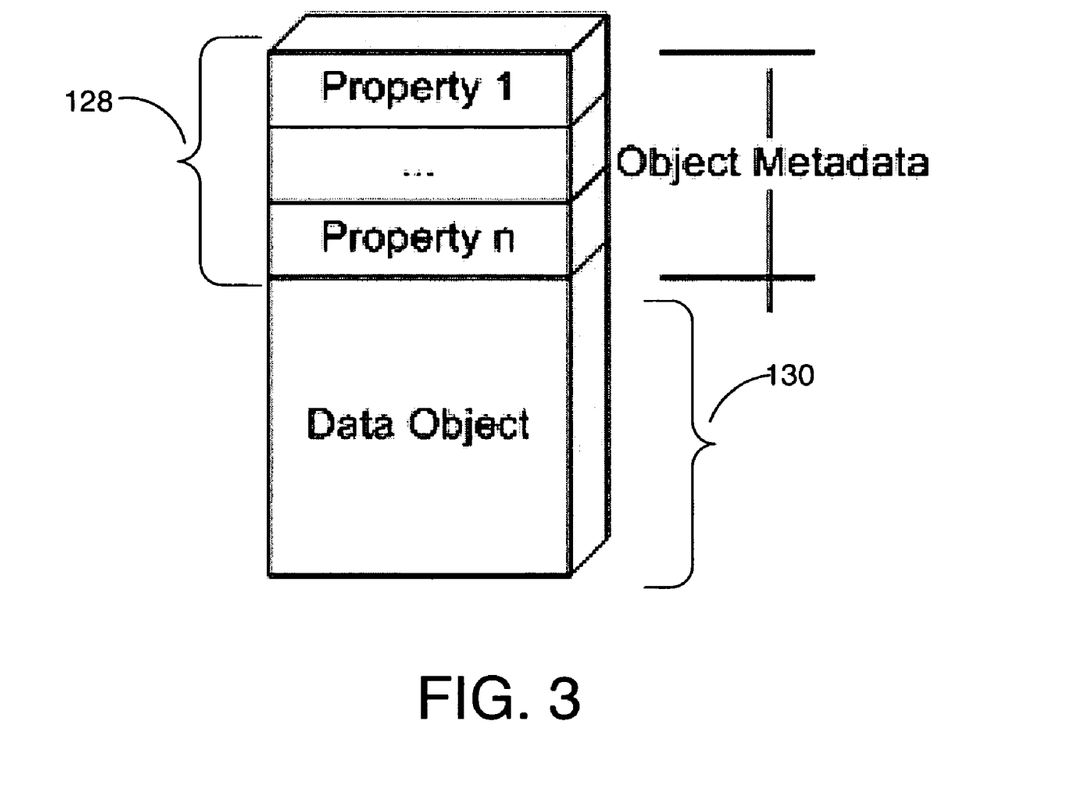
FIG. 3 illustrates the association of a media object representation, according to embodiments of the invention.

As illustrated in FIG. 3, the set of media objects 126 which are the object of the media enumeration request 114 or other access activity may in one regard be composed of media object data 130 along with an associated set of media object properties 128. The set of media object properties 128 may in one regard describe the type, format, content and other attributes or characteristics of the media object data 130 to which they relate, for example to specify image, video or audio content along with properties such as frame width, a frame height, a video sample length, artist data, a track number, a song title, a pixel color depth or other logical, physical or other properties of the media content encoded in the media object data 130. The number of properties which are stored in the set of media object properties 128 may vary, for instance according to the type of media or content being characterized by those properties.

Figure 4:
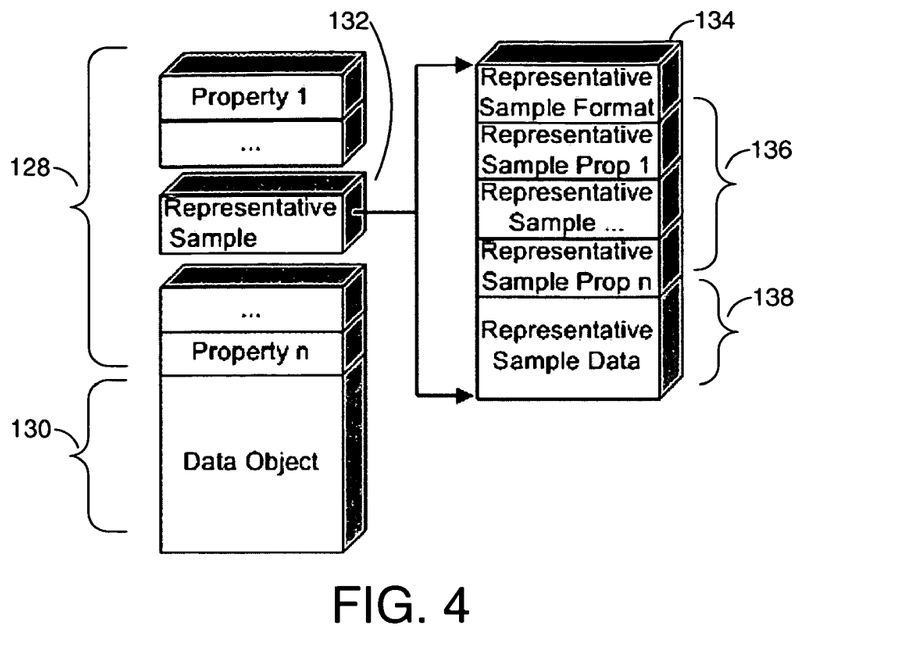
FIG. 4 illustrates the encapsulation of a representative sample of a media object in the set of properties associated with that object, according to embodiments of the invention.

FIG. 4 illustrates the encapsulation of a representative sample 132 of the media object data 130 within the properties for that object, according to embodiments of the invention. In embodiments as shown, the set of media object properties 128 may be expanded to include a representative sample 132, as another attribute or property of the media object data 130. The representative sample 132 itself may have associated with it a further set of properties and resources, including a set of representative sample properties 136 characterizing the representative sample 132 as a property, in nested fashion.

The representative sample 132 may represent a portion of the media object data 130 which summarizes, reflects, characterizes or otherwise relates to that content. Representative sample 132 when fully extracted may for instance contain a comparatively short video clip or trailer, such as 5 seconds or another length, of a longer digital video movie or video. The representative sample 132 may likewise be or include a relatively short sample, for instance 5 seconds or another length, of a longer song or other audio recording, or may be or include a set of image samples, such as a one-quarter section of a digital photograph, or samples, sections or portions or other media or content. The portion of the media object data 130 selected for representative sample 132 may be isolated in different ways. For example in embodiments, the device logic 122 or other sample engine or other control intelligence may process the media object data to detect identifying characteristics for a suitable sample portion or selection.

For example, in the case of an audio object the device logic 122 or other logic may examine the length of the song or audio clip to detect passages having the greatest peak amplitude, or greatest dynamic range. Those sections may correspond to a portion of a song for instance where a greater number of instruments are playing, a refrain is being sung or other more active or characteristic sound qualities are present. In the case of a video object, the device logic 122 or other controller may examine video frame data to determine a set of successive frames where dynamic contrast or apparent motion is greatest, for example using frame delta techniques. In the case of an image object, a section of the image, such as the center or a right or left quadrant, or a section with high luminance values may be extracted. Other selection rules, heuristics and other algorithms are possible.

According to embodiments of the invention in another regard, the representative sample data 138 may be or include data of a different type than that of the underlying media object data 130. For instance, a digital image of a person may be associated with that individual's contact information in a contact or email object, or a logo or emblem related to a recording artist or band may be embedded as a representative sample data for a song or other media. According to further embodiments, the representative sample data 138 may be or include multiple pieces of representative sample data of one type, or combinations of more than one data or media type.

When content is selected as the representative sample data 138, that data may be associated with a set of representative sample properties 136 which specify the type, attributes, properties or other metadata for the sample data. Representative sample properties 136 may for instance indicate that the sample contains audio or video content, along with the length of a video or audio sample, or the pixel color depth or audio sample of an image sample. The representative sample data 138 may also have associated with it a representative sample format 134, for instance to indicate that color values will be expressed in 16 or 24-bit format, that audio data will be encoded in Windows™ Audio or other formats or schema.

Figure 5:
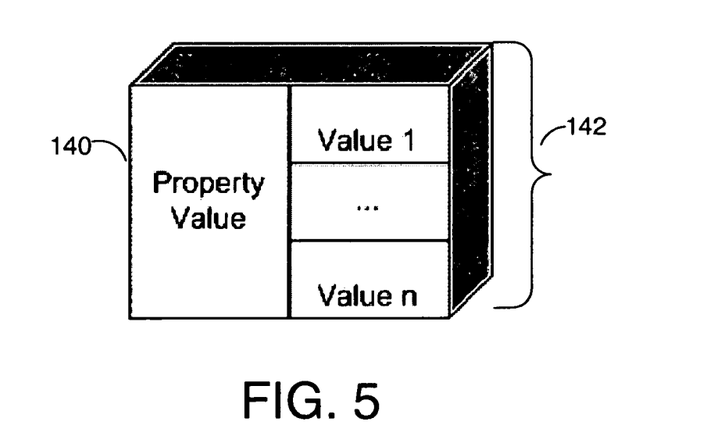
FIG. 5 illustrates a data structure for a sample property value identifier, according to embodiments of the invention.

In embodiments of the invention as illustrated in FIG. 5, the set of representative sample properties 136 and corresponding representative sample property value 140 (for example, 5 seconds for sample length) which characterize the representative sample data 138 may be subjected to checking, to ensure that constraints such as limitations on pixel width, sample length and other parameters are observed. Those constraints may be necessary for example to ensure reliable playback on a given portable media player, desktop computer or other playback or presentation device. For example a digital video camera may permit a sample of only a certain frame or pixel size, to permit playback on an integral LCD or other viewing screen. According to embodiments as shown, the representative sample property value 140 may be associated with a lookup table or other resource against which the validity of the value may be checked.

The lookup table or other resource may in further regard contain a set of representative sample property parameters 142, which define ranges or values for which the representative sample property value 140 is valid. For example, the set of representative sample property parameters 142 may include a minimum and maximum allowed value, and for instance in embodiments a step value permitted in between. The set of representative sample property parameters 142 may likewise contain an enumerated list of permitted values, such as 120×120, 160×160 or 200×200 for pixel tile sizes. Other parameters and constraints are possible. According to embodiments of the invention, one or more representative sample property value 140 may be pre-populated based on the set of representative sample property parameters 142. In embodiments, the set of representative sample property parameters 142 may be self-contained or stored along and associated with each representative sample property, or be globally accessible for lookup in a lookup table or other resource in responder 118. Other configurations are possible.

Because the representative sample 132 generated according to embodiments of the invention is not fixed in format but instead can be tailored to different media or host devices, the ability to check the set of representative sample properties 136 for conformance to device or other limitations may help to ensure that representative sample 132 may be retrieved, accessed and viewed or audibly outputted without unexpected faults.

Therefore according to embodiments of the invention in general regard, the data grouping of the representative sample data 138, the set of representative sample properties 136 and the representative sample format 134 may be associated with a representative sample 132 which encapsulates representative content, as a property within the set of properties 128 of the larger media object data 130. Because the representative sample 132 is encoded as a property object which may in embodiments be understood in and integral to the media transport protocol 110, no modification or special programming of the responder 118 or other resources may be needed to generate the representative sample 134. This is the case even when the media object data 130 itself neither explicitly contains nor allows for an internal sample.

Likewise, since the representative sample 132 is stored in a separate object, the representative sample 132 may be transmitted to initiator 104 or other requesting device for independent viewing or audible or other output, ahead of the underlying media content. The user may therefore gain an indication of the nature or type of media content within one or more objects in the set of media objects 126, without having to retrieve or open the objects themselves.

Figure 6:
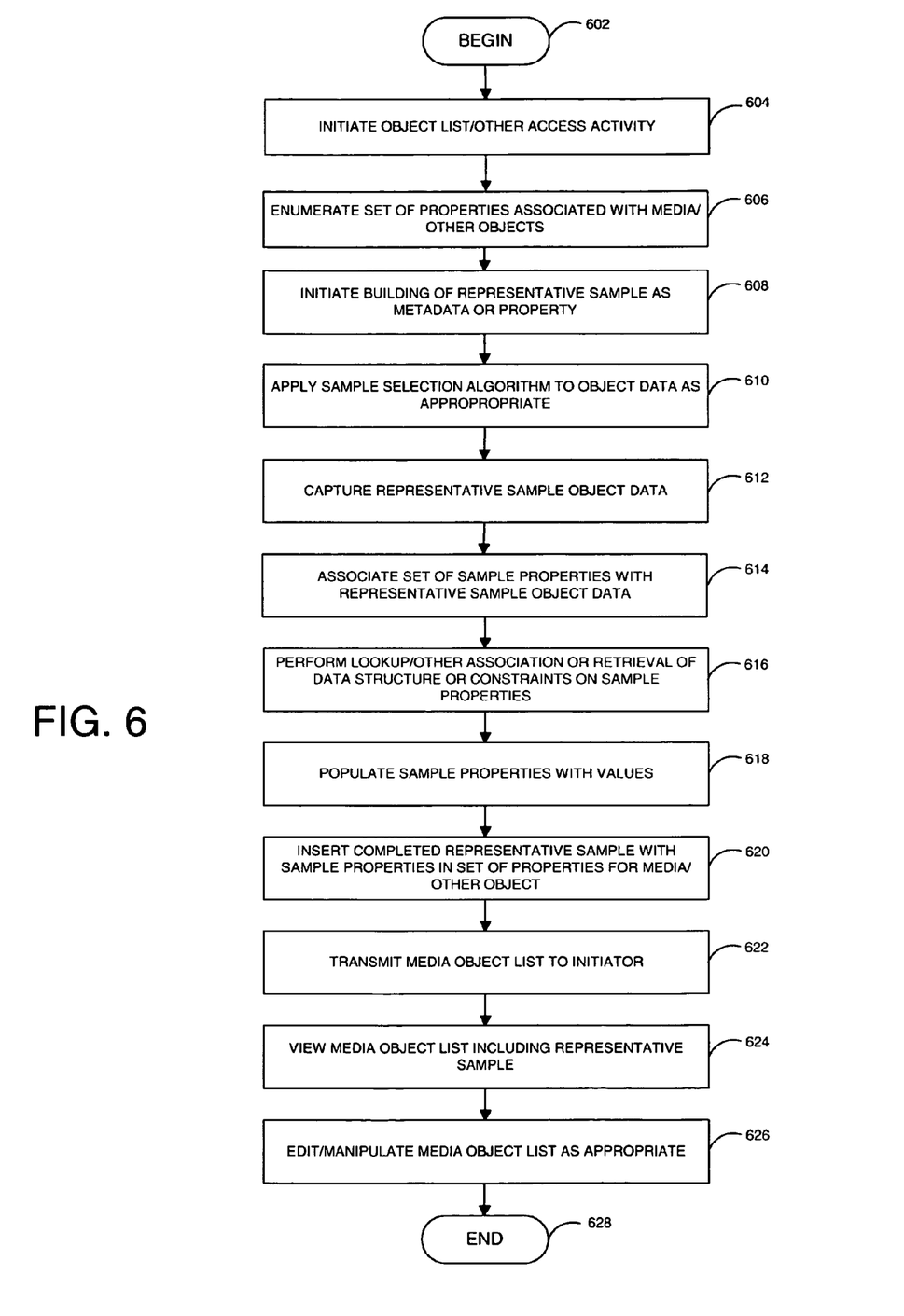
FIG. 6 illustrates a flowchart of overall representative sample processing, according to embodiments of the invention.

FIG. 6 illustrates overall representative sample and related processing, according to embodiments of the invention. In step 602, processing may begin. In step 604, an initiator 104 may initiate a media enumeration request 114 for a media object list 116, or other access activity may be initiated, such as a responder 118 generating or updating media objects on its own. In step 606, a set of media object properties 128 related to one or more media object data 130 stored in responder 118 may be enumerated. In step 608, the building of a representative sample 132 may be initiated, for example as metadata, attributes or properties which form part of the set of media object properties 128 related to the media object data 130. In step 610, a sample selection algorithm, such as algorithms which detect a rate of video motion or audio peak amplitude, may be applied to the media object data 130 being processed.

In step 612, representative sample data 138 may be captured or generated, for example by extracting the second full minute of a video object, or by sampling twenty seconds of audio surrounding the peak volume or amplitude of an audio or music object. In step 614, a set of representative sample properties 136 such as sample length, codec, pixel color depth or other parameters or characteristics may be associated with the representative sample data 138. In step 616, a lookup or other retrieval or association of a set of representative sample property parameters 142 may be performed, to detect constraints or standards for the set of representative sample properties 136, for example a maximum frame width or maximum sample duration. In step 618, the set of representative sample properties 136 may be populated with values for the sample of the media object being processed, for example to indicate a sample length, date or time of creation, sample object byte size, pixel color depth or other attributes or properties, constrained by the set of representative sample property parameters 142 or otherwise. Properties which do not conform to a constraints encoded in the representative sample property parameters 142 may for example be reduced to a maximum allowable value, set to a default value or otherwise processed.

In step 620, the completed representative sample 132 containing the generated set of representative sample properties 136 may be inserted into the set of media object properties 128 associated with the media object data 130 whose sample has thus been generated, itself as a property or metadata. In step 622, a media object list 116 containing the set of media object properties 128 for one or more media objects in the set of media objects 126, including those with representative samples so generated may be transmitted to initiator 104.

In step 624, the media object list 116 may be viewed on an interface 102 of initiator 104, including to view, audio playback or other presentation of the representative sample 132 for each media object containing such a sample. In step 626, media object list 116 may be edited or manipulated as appropriate, for example to sort the object titles or other properties in the media object list 116, or retrieve, delete or otherwise access or process underlying media objects in the set of media objects 126 on responder 118. In step 628, processing may return to a prior processing point, jump to a further processing point, repeat or end.

The foregoing description of the invention is illustrative, and modifications in configuration and implementation will occur to persons skilled in the art. For instance, while the invention has generally been described in terms of embodiments in which one representative sample 132 may be generated for a media object, in embodiments more than one representative sample 132, for example multiple photographs from a set of digital photographs, may be generated. For further instance, while the invention has generally been described in terms of the retrieval of a representative sample 132 retrieved from a portable media device storing a set of associated media objects, in embodiments non-portable devices, such as other desktop client or other machines, may be interrogated to retrieve samples.

Likewise, while the representative sample objects have generally been illustratively described as being or including audio, video, or graphical content, in embodiments the set of media objects may likewise contain textual, character, numerical or other information, for example such as contact lists in a personal digital assistant, or other data or media. Moreover, while the initiator device retrieving the representative sample 132 has in embodiments generally been described as a desktop client or workstation, in embodiments the initiator could be or include a portable device such as a media-enabled cellular telephone, digital camera, audio player or other device or hardware. Portable devices moreover may interrogate each other to retrieve representative samples, as desired.

By the same token, while the invention has in embodiments been generally described as involving a responder 118 such as a digital video camcorder or other source or host device which itself may generate representative sample 132, in embodiments the initiator 114 or other resources, for example such as a remote server, may generate the sample construct from media objects retrieved from a source device. Other hardware, software or other resources described as singular may in embodiments be distributed, and similarly in embodiments resources described as distributed may be combined. The scope of the invention is accordingly intended to be limited only by the following claims.

We claim:

1. A system for generating a representative sample of a media object, comprising:
   a responder device having a processor, the responder device including:
   an access interface to access a set of media objects, each of the set of media objects comprising media object data and a set of media object properties, wherein the set of media objects comprises at least one audio media object; and
   a sample engine, the sample engine communicating with the access interface to access the set of media objects and generate an audio representative sample for at least one of the at least one audio media object, the audio representative sample being encapsulated in the set of media object properties for that object, wherein the representative sample comprises one or more representative sample properties characterizing the representative sample that are compared with one or more representative sample property parameters associated with a device that define one or more numerical values for which the one or more representative sample properties are valid to determine if the at least one audio media object is valid.

2. The system according to claim 1, wherein the set of media objects comprises at least one of a video media object, and an image media object.

3. The system according to claim 1, wherein the access interface comprises a media directory on a responder device storing the set of media objects.

4. The system according to claim 1, wherein the sample engine generates the representative sample by selectively detecting a sample portion of the media object data.

5. The system according to claim 4, wherein the selective detection comprises at least one of detecting a peak audio amplitude and detecting a change in video motion.

6. The system according to claim 1, wherein the representative sample comprises at least representative sample data and a set of representative sample properties.

7. The system according to claim 6, wherein the set of representative sample properties are constrained by a set of representative sample property parameters.

8. The system according to claim 1, wherein the set of media object properties are transmitted to an initiator device.

9. The system according to claim 8, wherein the initiator device is configured to display or audibly output the representative sample to indicate the content of a media object thereby.

10. The system according to claim 1, wherein the set of media objects comprise binary objects.

11. A computer-implemented method for generating a representative sample of a media object, comprising:
   accessing a set of media objects, each of the set of media objects comprising media object data and a set of media object properties; and
   generating a representative sample for at least one of the media objects, the representative sample being encapsulated in the set of media object properties for that media object, the representative sample comprising one or more representative sample properties or associated values that characterize the representative sample; and
   comparing the one or more representative sample properties or associated values with one or more representative sample property parameters associated with a device that define a numerical range or a numerical value for which the one or more representative sample properties are valid to determine if the representative sample is valid such that the representative sample can be adequately retrieved, accessed, viewed, or output by the device.

12. The method according to claim 11, wherein the set of media objects comprises at least one of a video media object, an audio media object and an image media object.

13. The method according to claim 11, wherein the accessing comprises accessing a media directory on a responder device storing the set of media objects.

14. The method according to claim 11, wherein the generating comprises selectively detecting a sample portion of the media object data.

15. The method according to claim 14, wherein the selectively detecting comprises at least one of detecting a peak audio amplitude and detecting a change in video motion.

16. The method according to claim 11, wherein the representative sample comprises at least representative sample data and a set of representative sample properties.

17. The method according to claim 16, wherein the set of representative sample properties are constrained by a set of representative sample property parameters.

18. The method according to claim 11, further comprising transmitting the set of media object properties to an initiator device.

19. The method according to claim 18, further comprising displaying or audibly outputting the representative sample to indicate the content of a media object thereby.

20. The method according to claim 11, wherein the set of media objects comprise binary objects.

21. A computer-implemented method for generating a representative sample of a media object, comprising:
   accessing a set of media objects, each of the set of media objects comprising media object data and a set of media object properties, wherein the set of media objects comprises one or more audio media objects;
   generating an audio representative sample for one or more of the one or more audio media objects, the audio representative sample being encapsulated in the set of media object properties for that media object, wherein the audio representative sample comprises one or more representative sample properties or associated values that characterize the audio representative sampled; and
   comparing the one or more representative sample properties or associated values with one or more representative sample property parameters associated with a device that define a range or a value for which the one or more representative sample properties or associated values are valid such that the audio representative sample can be retrieved, accessed, or audibly output without unexpected faults, wherein the audio representative sample can be retrieved, accessed, or audibly output via the device if the one or more representative sample properties or associated values are within the range of the one or more representative sample property parameters or match the value of the one or more representative sample property parameters associated with the device, the one or more representative sample property parameters being stored with the one or more representative sample properties or being accessible via a lookup table.

22. The method according to claim 21, wherein the set of media objects comprises at least one of a video media object, and an image media object.

23. The method according to claim 21, wherein the accessing comprises accessing a media directory on a responder device storing the set of media objects.

24. The method according to claim 21, wherein the generating comprises selectively detecting a sample portion of the media object data.

25. The method according to claim 24, wherein the selectively detecting comprises at least one of detecting a peak audio amplitude and detecting a change in video motion.

26. The method according to claim 21, wherein the representative sample comprises at least representative sample data and a set of representative sample properties.

27. The method according to claim 26, wherein the set of representative sample properties are constrained by a set of representative sample property parameters.

28. The method according to claim 21, wherein the method further comprises transmitting the set of media object properties to an initiator device.

29. The method according to claim 28, further comprising displaying or audibly outputting the representative sample to indicate the content of a media object thereby.

30. The method according to claim 21, wherein the set of media objects comprise binary objects.

* * * * *

UNITED STATES PATENT AND TRADEMARK OFFICE
CERTIFICATE OF CORRECTION

PATENT NO. : 7,574,655 B2  Page 1 of 1
APPLICATION NO. : 10/836261
DATED : August 11, 2009
INVENTOR(S) : Manders et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 770 days.

Signed and Sealed this

Fourteenth Day of December, 2010

David J. Kappos
*Director of the United States Patent and Trademark Office*